(12) United States Patent
Lautenbach

(10) Patent No.: US 7,531,009 B2
(45) Date of Patent: May 12, 2009

(54) 6-AZO-5,5'-DIHYDROXY-7,7'-DISULFO-2-2' DINAPHTHYLAMINE DERIVATIVES

(75) Inventor: Holger Lautenbach, Rheinfelden (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 139 days.

(21) Appl. No.: 11/795,060

(22) PCT Filed: Jan. 11, 2006

(86) PCT No.: PCT/EP2006/050141

§ 371 (c)(1),
(2), (4) Date: Jul. 11, 2007

(87) PCT Pub. No.: WO2006/077189

PCT Pub. Date: Jul. 27, 2006

(65) Prior Publication Data

US 2008/0196180 A1  Aug. 21, 2008

(30) Foreign Application Priority Data

Jan. 21, 2005 (EP) .................................. 05100388

(51) Int. Cl.
*D06P 1/02* (2006.01)
*C09B 35/02* (2006.01)

(52) U.S. Cl. ........................ 8/466; 8/506; 8/662; 8/669; 8/681; 8/919; 534/828

(58) Field of Classification Search .............. 8/466, 8/506, 662, 669, 681, 919; 534/828
See application file for complete search history.

(56) References Cited

U.S. PATENT DOCUMENTS

| 2,583,519 | A |   | 1/1952 | Schmid et al. ............... 260/166 |
| 2,775,582 | A | * | 12/1956 | Anderson .................... 534/660 |
| 3,445,451 | A | * | 5/1969 | St. Alban et al. ............. 534/642 |
| 4,111,649 | A |   | 9/1978 | Ward et al. ........................ 8/41 |
| 5,366,543 | A |   | 11/1994 | Ono et al. ...................... 106/22 |
| 6,120,561 | A |   | 9/2000 | Wild et al. ...................... 8/527 |

FOREIGN PATENT DOCUMENTS

| EP | 0 802 240 | | 10/1997 |
| JP | 58-174461 | | 10/1983 |
| JP | 58-176277 | | 10/1983 |
| JP | 58176277 | * | 10/1983 |
| JP | 3-000769 | | 1/1991 |
| JP | 10-195320 | | 7/1998 |
| JP | 2002-121431 | | 4/2002 |

OTHER PUBLICATIONS

STIC Search Report dated Jan. 13, 2009.*
Derwent Abst. No. 1998-463026[40] of JP 10-195320.
Derwent Abst. No. 1991-048168[42] of JP 3-000769.
Derwent Abst. No. 2002-0560666[60] of JP 2002-121431.
Derwent Abst. No. 1983-823333[47] of JP 58-174461.
Derwent Abst. No. 1983-824080[47] of JP 58-176277.

* cited by examiner

*Primary Examiner*—Eisa B Elhilo
(74) *Attorney, Agent, or Firm*—Shiela A. Loggins

(57) ABSTRACT

The present invention provides 6-azo-5,5'-dihydroxy-7,7'-disulfo-2,2'-dinaphthylamine derivatives, their use as dyes, dyed paper and formulations comprising them.

8 Claims, No Drawings

6-AZO-5,5'-DIHYDROXY-7,7'-DISULFO-2-2' DINAPHTHYLAMINE DERIVATIVES

The present invention refers to 6-azo-5,5'-dihydroxy-7,7'-disulfo-2,2'-dinaphthylamine derivatives, to their use as dyes, to dyed paper and to formulations comprising them.

Compounds having two 7-amino-3-azo-4-hydroxy-2-naphthalenesulfonic acid units are common dyes.

DE 196 15 260 A1, for example, describes dyes of the formula

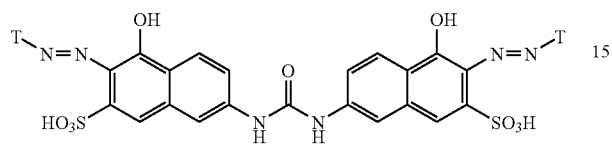

in which two 7-amino-3-azo-4-hydroxy-2-naphthalenesulfonic acid units are linked via a urea group.

It is an object of the present invention to provide novel dyes having two 7-amino-3-azo-4-hydroxy-2-naphthalenesulfonic acid units, which can be used for dyeing natural or synthetic materials, especially paper, and which show excellent colour strength, brilliance and substantivity.

This object is solved by the 6-azo-5,5'-dihydroxy-7,7'-disulfo-2,2'-dinaphthylamine derivatives according to claims 1-3 by aqueous and solid formulations thereof according to claims 7 and 8 and by paper according to claim 6.

The 6-azo-5,5'-dihydroxy-7,7'-disulfo-2,2'-dinaphthylamine derivatives of the present invention have formula

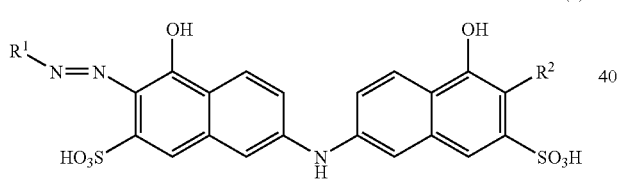 (1)

in which
$R^1$ represents

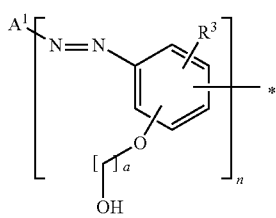

in which
a is 1-4
n is 0 or 1,
$R^3$ represents hydrogen, $C_{1-4}$-alkyl, $C_{3-6}$-cycloalkyl, aralkyl, phenyl, $C_{1-4}$-alkoxy, sulfo, hydroxy, nitro, halogen, $C_{1-4}$-alkylcarbonyl, carboxy, carbamoyl, $C_{1-4}$-alkoxycarbonyl, $C_{1-4}$-alkylaminocarbonyl, cyano, amino, ureido or $NHCOC_{1-4}$-alkyl, whereby $C_{1-4}$-alkyl and $C_{1-4}$-alkoxy may be substituted with hydroxy or $C_{1-4}$-alkoxy, and phenyl may be substituted with $C_{1-4}$-alkyl, $C_{1-4}$-alkoxy, sulfo, hydroxy, nitro, halogen or carboxy, and $A^1$ if n is 1 is selected from the group consisting of

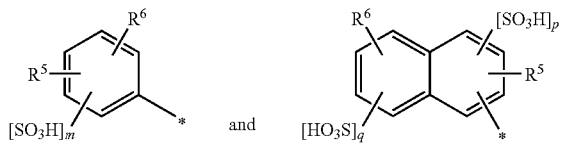

in which
m, p and q are identical or different, and are 0, 1 or 2,
$R^5$ and $R^6$ are identical or different and represent hydrogen, $C_{1-4}$-alkyl, $C_{3-6}$-cycloalkyl, aralkyl, phenyl, $C_{1-4}$-alkoxy, sulfo, hydroxy, nitro, halogen, $C_{1-4}$-alkylcarbonyl, carboxy, carbamoyl, $C_{1-4}$-alkoxycarbonyl, $C_{1-4}$-alkylaminocarbonyl, cyano, amino, ureido or NHCOC$_{1-4}$-alkyl, whereby $C_{1-4}$-alkyl and $C_{1-4}$-alkoxy may be substituted with hydroxy or $C_{1-4}$-alkoxy, and phenyl may be substituted with $C_{1-4}$-alkyl, $C_{1-4}$-alkoxy, sulfo, hydroxy, nitro, halogen or carboxy, and $A^1$ if n is 0 is

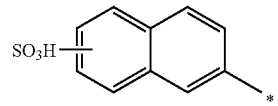

$R^2$ represents H or

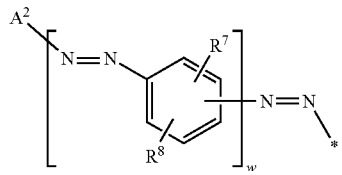

in which
w is 0 or 1,
$R^7$ and $R^8$ are identical or different and represent hydrogen, $C_{1-4}$-alkyl, $C_{3-6}$-cycloalkyl, aralkyl, phenyl, $C_{1-4}$-alkoxy, sulfo, hydroxy, nitro, halogen, $C_{1-4}$-alkylcarbonyl, carboxy, carbamoyl, $C_{1-4}$-alkoxycarbonyl, $C_{1-4}$-alkylaminocarbonyl, cyano, amino, ureido or NHCO $C_{1-4}$-alkyl, whereby $C_{1-4}$-alkyl and $C_{1-4}$-alkoxy may be substituted with hydroxy or $C_{1-4}$-alkoxy, and phenyl may be substituted with $C_{1-4}$-alkyl, $C_{1-4}$-alkoxy, sulfo, hydroxy, nitro, halogen or carboxy, and $A^2$ represents either $A^1$, whereby $A^1$ has the meaning as indicated for the 6-azo-5,5'-dihydroxy-7,7'-disulfo-2,2'-dinaphthylamine derivatives 1 of the present invention, or $A^2$ represents

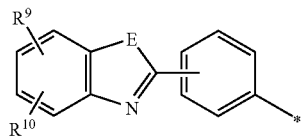

in which $R^9$ and $R^{10}$ are identical or different and represent hydrogen, $C_{1-4}$-alkyl, $C_{1-4}$-alkoxy, sulfo, hydroxy, nitro or carboxy,
E represents sulfur or NH.

$C_{1-4}$-Alkyl is methyl, ethyl, propyl, isopropyl, butyl, sec-butyl, tert-butyl or isobutyl. $C_{1-4}$-Alkoxy is methoxy, ethoxy, propoxy, isopropoxy, butoxy, sec-butoxy, tert-butoxy or isobutoxy. $C_{3-6}$-Cycloalkyl is cyclopropy, cyclobutyl, cyclopentyl or cyclohexyl. Aralkyl can be benzyl or 2-phenylethyl. $C_{1-4}$-Alkoxy is methoxy, ethoxy, propoxy, isopropoxy, butoxy, sec-butoxy, tert-butoxy or isobutoxy. Halogen can be fluorine, bromine, chlorine or iodine.

Preferences:

$R^3$ preferably represent hydrogen, $C_{1-4}$-alkyl, $C_{1-4}$-alkoxy, sulfo, hydroxy, nitro or carboxy, whereby $C_{1-4}$-alkyl and $C_{1-4}$-alkoxy may be substituted with hydroxy.

More preferably $R^3$ represents $C_{1-4}$-alkyl, e.g. methyl.

$R^5$ and $R^6$ are identical or different and represent hydrogen, $C_{1-4}$-alkyl, $C_{1-4}$-alkoxy, hydroxy, nitro or carboxy, whereby $C_{1-4}$-alkyl and $C_{1-4}$-alkoxy may be substituted with hydroxy.

More preferably $R^5$ and $R^6$ are identical or different and represent hydrogen, $C_{1-4}$-alkyl, nitro or hydroxy.

$R^7$ and $R^8$ are identical or different and represent hydrogen, $C_{1-4}$-alkyl, $C_{1-4}$-alkoxy, hydroxy, nitro or carboxy, whereby $C_{1-4}$-alkyl and $C_{1-4}$-alkoxy may be substituted with hydroxy.

More preferably $R^7$ is $C_{1-4}$-alkyl, which may be substituted with hydroxy and $R^3$ is $C_{1-4}$-alkyl.

Even more preferred are 6-azo-7-amino-4-hydroxy-2-naphthalenesulfonic acid derivatives of formula 1 wherein $R^1$ represents

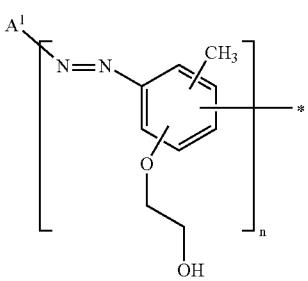

in which
n is 0 or 1,
$A^1$ if n is 1 is selected from the group consisting of

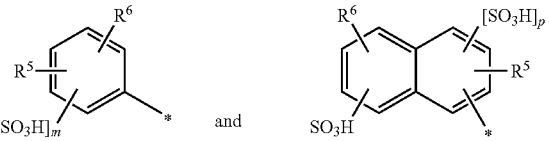

in which
m is 1 or 2,
p is 0 or 1,
$R^5$ is hydrogen, methyl or nitro,
$R^6$ is hydrogen or hydroxy, and
$R^2$ represents H or

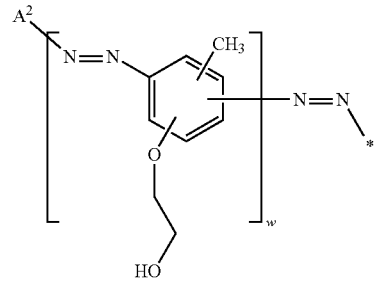

in which
w is 0 or 1,
$A^2$ represents either $A^1$ as defined above or is selected from the group consisting of

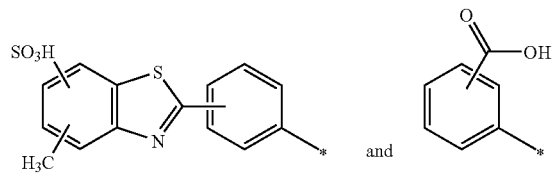

Most preferred are 6-azo-5,5'-dihydroxy-7,7'-disulfo-2,2'-dinaphthylamine derivatives of formula 1 wherein
n is 0 and $R^1$ and $R^2$ are both

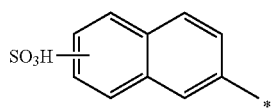

Also part of the invention, is the use of the 6-azo-5,5'-dihydroxy-7,7'-disulfo-2,2'-di-naphthylamine derivatives 1 of the present invention as a dye for dyeing natural or synthetic materials such as paper, cellulose, polyamide, leather or glass fibres. Preferably the 6-azo-5,5'-dihydroxy-7,7'-disulfo-2,2'-dinaphthylamine derivatives 1 are used for dyeing paper.

Paper dyed with 6-azo-5,5'-dihydroxy-7,7'-disulfo-2,2'-di-naphthylamine derivatives 1 is also part of the invention.

The 6-azo-5,5'-dihydroxy-7,7'-disulfo-2,2'-dinaphthylamine derivatives 1 are dyes, which show excellent colour strength, luminance and substantivity.

Due to the —O—[(CH$_2$)$_2$]$_a$—OH group the compounds are less carcinogen.

EXAMPLES

Examples 1

Preparation of

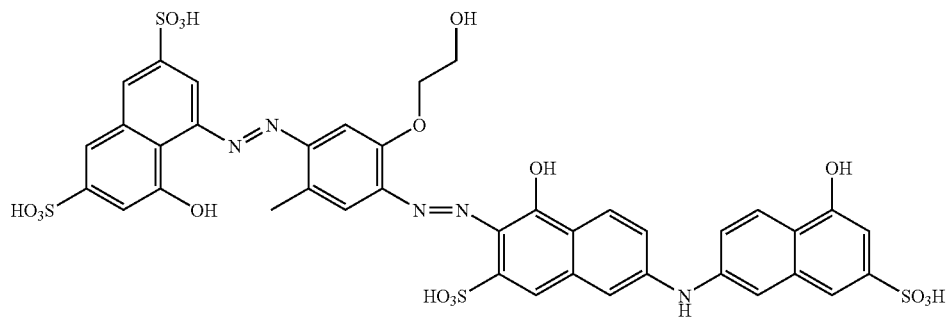

The 6-azo-5,5'-dihydroxy-7,7'-disulfo-2,2'-dinaphthylamine derivatives 1 can be applied to the materials, preferably to paper, in the form of aqueous or solid formulations.

The aqueous and solid formulations comprising 6-azo-5,5'-dihydroxy-7,7'-disulfo-2,2'-di-naphthylamine derivatives 1 are also part of the invention.

The solid formulations comprising 6-azo-5,5'-dihydroxy-7,7'-disulfo-2,2'-dinaphthylamine derivatives 1 can be powders or granulate materials, and may include auxiliaries. Examples of auxiliaries are solubilizers such as urea, extenders such as dextrin, Glauber salt or sodium chloride, sequestrants such as tetrasodium phosphate, and also dispersants and dust-proofing agents.

The aqueous formulations comprising 6-azo-5,5'-dihydroxy-7,7'-disulfo-2,2'-dinaphthylamine derivatives 1 may also include auxiliaries. Examples of auxiliaries used for aqueous formulations are solubilizers such as ε-caprolactam or urea, and organic solvents such as glycols, polyethylene or polypropylene glycols, dimethyl sulphoxide, N-methylpyrrolidone, acetamide, alkanolamines or polyglycolamines. Further auxiliaries used in aqueous formulations are viscosity modifiers, antifoaming agents or dispersing agents.

Preferably, the aqueous formulations are aqueous solutions which comprise from 5 to 30% by weight 6-azo-5,5'-dihydroxy-7,7'-disulfo-2,2'-dinaphthylamine derivatives 1 based on the weight of the solution. Preferably, these concentrated aqueous solutions also contain a low level of inorganic salts, which may be achieved by known methods, for example by reverse osmosis.

46% (w/v) sodium nitrite (75.8 mL) is added to a suspension of 49.7% (w/w) 4-[(4-amino-5-hydroxyethoxy-o-tolyl)azo]-5-hydroxynaphthalene-2,7-disulphonic acid (123 g) in desalinated water (600 mL) at room temperature. The obtained solution is cooled to 10° C. and added to a solution of concentrated HCL (195.5 mL) in desalinated water (200 mL) within 90 minutes. The reaction mixture is stirred for further 60 minutes at room temperature. Excess nitrite is destroyed by addition of sulfamic acid.

The obtained solution is added to a suspension of 5,5'-dihydroxy-7,7'-disulfo-2,2'-dinaphthyl-amine (91.24% (w/w), 92 g) in desalinated water (300 mL) within 90 minutes at room temperature and at pH 9.0. The reaction mixture is stirred overnight at room temperature.

NaOH (50% (w/v), 167 mL) is added to the solution. The reaction mixture is warmed to 90° C. for 2 hours. Then, the reaction mixture is cooled to room temperature, and the pH is adjusted to 7.3. Isopropanol (600 mL) is added at room temperature. The obtained precipitate is filtered and dried in vacuo at 80° C. to yield 152 g=69%

The 4-[(4-amino-5-hydroxyethoxy-o-tolyl)azo]-5-hydroxynaphthalene-2,7-disulphonic acid is prepared analogous to Example 3.

Example 2

Preparation of

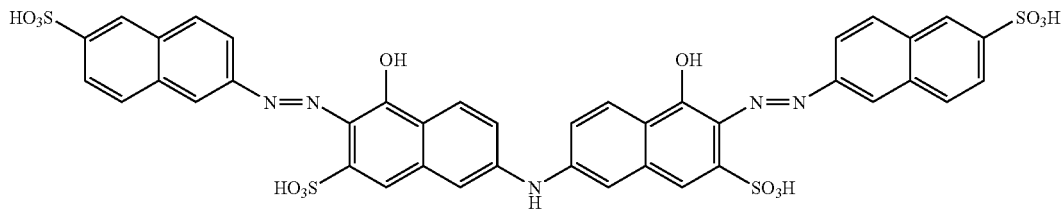

HCl conc (24.49 mL) is added to a suspension of 95% 6-amino-2-naphthalenesulfonic acid (23.5 g) in salinated water (140 mL). 46% (w/v) Sodium nitrite (15.16 mL) is added within 20 minutes at 10° C. The mixtures is diluted with salinated water (50 mL) and stirred for further 30 minutes.

The obtained solution is added to a suspension of 91.24% (w/w) 5,5'-dihydroxy-7,7'-disulfo-2,2'-dinaphthylamine (25.29 g) in desalinated water (250 mL) within 90 minutes at 10° C. and at pH 8.2. The reaction mixture is warmed to room temperature. Isopropanol (500 mL) is added and the mixture is stirred for 15 minutes. The mixture is filtrated and the precipitate is dried to yield 37.88 g

Examples 3

Preparation of

HCl conc (24.49 mL) is added to a suspension of 97.2% 1-amino-6-naphthalenesulfonic acid (11.41 g) in salinated water (60 mL) at room temperature. 46% (w/v) Sodium nitrite (7.58 mL) is added within 30 minutes at 10° C. Excess nitrite is destroyed by addition of sulfamic acid, and the pH is adjusted to 2.1. To this solution was added within 10 minutes a solution of 2-(2'-hydroxyethoxy)-5-methylanilin (8.6 g) in desalinated water (50 mL) having a pH of 1.8.

The pH of the mixture is slowly raised to pH 5. The mixture is filtered and the filtrate is treated with 46% 7 w/v) sodium nitrite (7.58 mL), and then added to a solution of HCl conc (24.49 mL) in desalinated water (50 mL). The mixture is stirred for 1 h and excess nitrite is destroyed by addition of sulfamic acid.

This solution is added within 50 minutes to a solution of the compound

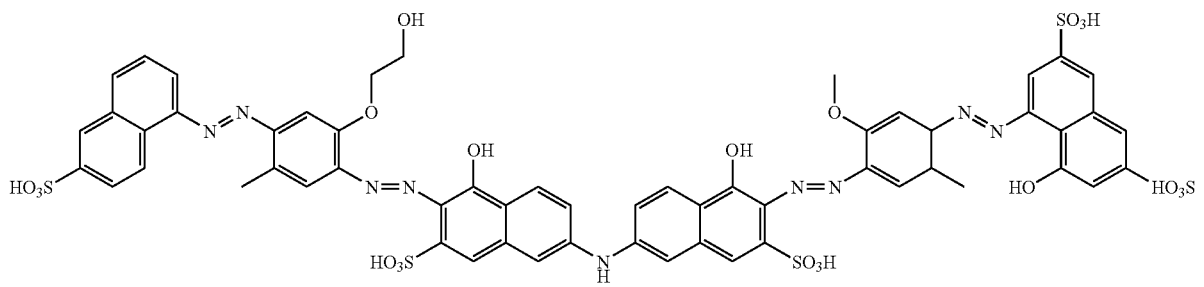

(1i)

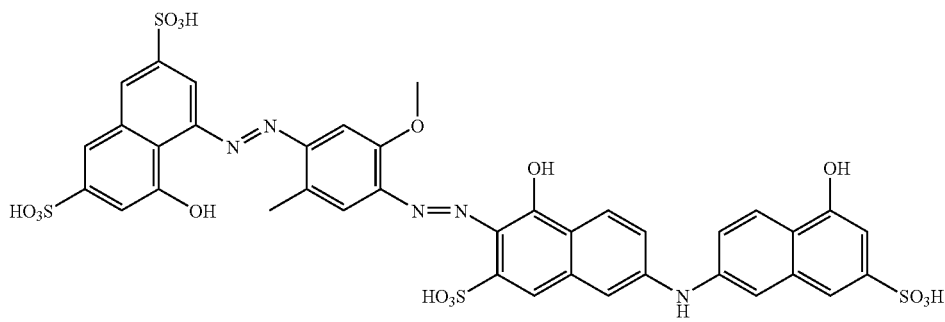

in desalinated water (100 mL) at room temperature and pH 8. The mixture is stirred for 1 hour at room temperature. Isopropanol (500 mL) is added. The mixture is filtered and the precipitate is dried to yield 48.89 g The above compound is prepared as follows:

46% (w/v) sodium nitrite (75.8 mL) is added to a suspension of 49.7% (w/w) 4-[(4-amino-5-methoxy-o-tolyl)azo]-5-hydroxynaphthalene-2,7-disulphonic acid (611.27 g) in desalinated water (600 mL) at room temperature. The obtained solution is cooled to 10° C. and added to a solution of concentrated HCL (195.5 mL) in desalinated water (200 mL) within 90 minutes. The reaction mixture is stirred for further 60 minutes at room temperature. Excess nitrite is destroyed by addition of sulfamic acid.

The obtained solution is added to a suspension of 5,5'-dihydroxy-7,7'-disulfo-2,2'-dinaphthyl-amine (91.24% (w/w), 252.89 g) in desalinated water (300 mL) within 90 minutes at room temperature and at pH 9.0. The reaction mixture is stirred overnight at room temperature.

NaOH (50% (w/v), 167 mL) is added to the solution. The reaction mixture is warmed to 90° C. for 2 hours. Then, the reaction mixture is cooled to room temperature, and the pH is adjusted to 7.3. Isopropanol (600 mL) is added at room temperature. The obtained precipitate is filtered and dried in vacuo at 80° C. to yield 400.2 g In an analogous manner can be prepared:

Ex. 4

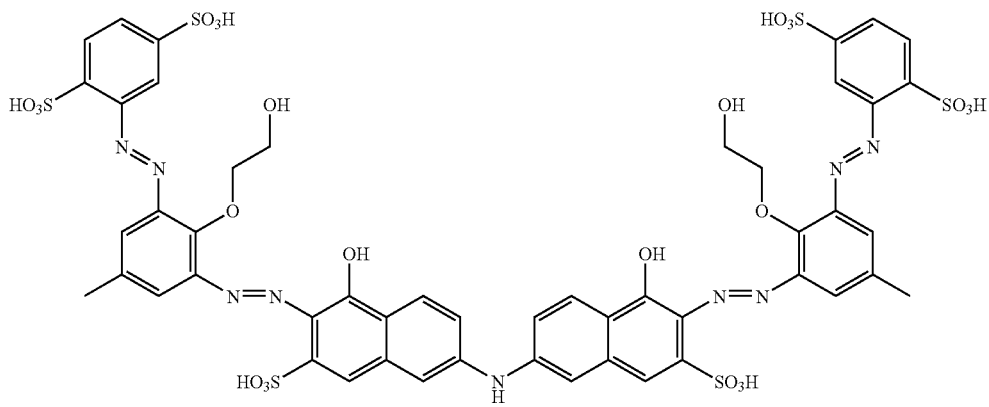

Ex. 5

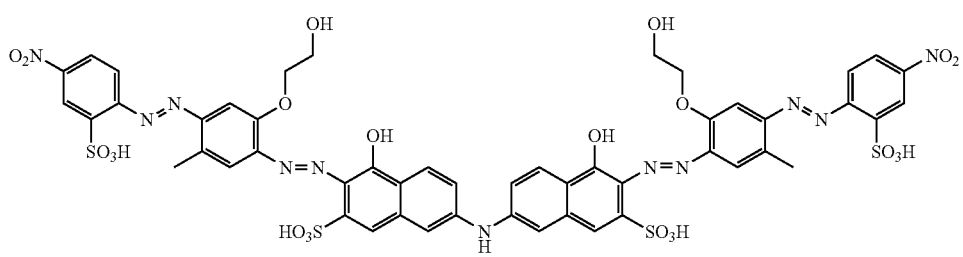

-continued
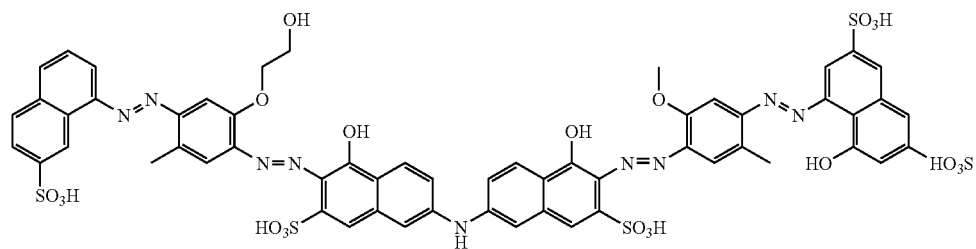
Ex. 6
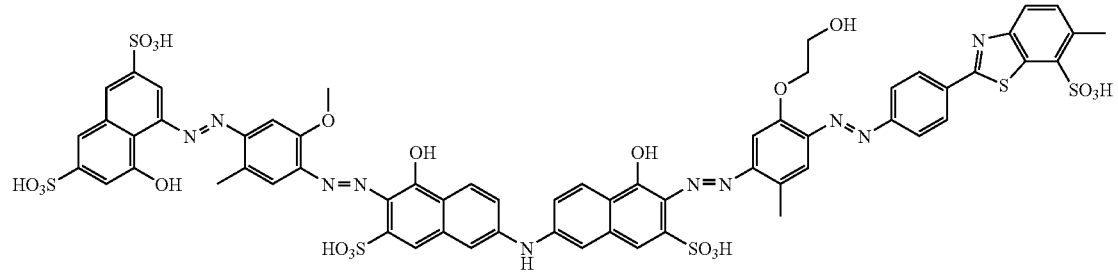
Ex. 7
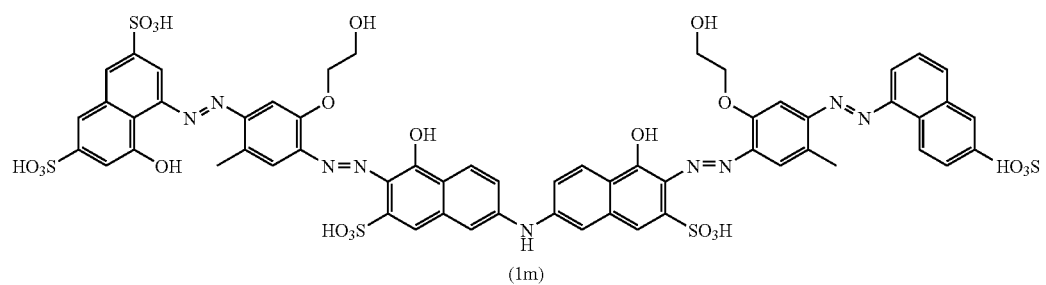
(1m)
Ex. 8
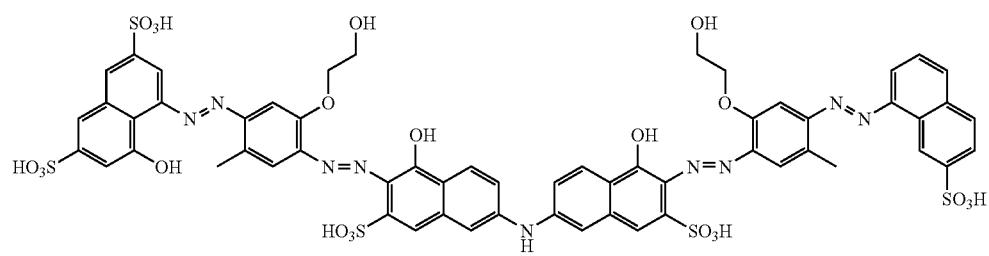
Ex. 9

Application Examples

Under standard application conditions the paper pulp is stirred with dye over a defined time period (i.e. 15 min.). If necessary a fixing agent, i.e. Tinofix WSP, will be added. With this pulp a hand sheet will be formed by a sheet former and then dried. The dosage of the dyestuff will be adjusted to a defined color depth, i.e. (reference depth) RD 0.2.

In case of the comparable urea bridge dye

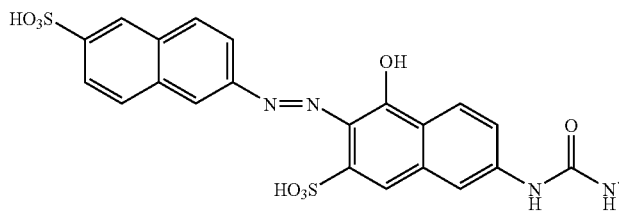

0.3% of dried material was used. The di-J-acid compound needs only 0.24% to achieve the depth.

The degree of exhaustion was determined after an internal method.

The light fastness is evaluated in a light fastness machine according to ISO 105 B02, assessed against blue scale.

The color strength was determined with Helios CFU at reverence depth (RD) 0.2. The CIELab coordinates and degrees of exhaustion of the dyes are measured.

Table 1 shows the results

| Example | Exhaustion % | Light fastness | C value (brilliancy) | Hue |
|---|---|---|---|---|
| 2 | 96 | 1 | 41.7 | 342 |
| 3 | 92 | 2-3 | 22.6 | 262 |
| 4 | 91 | 1+ | 27 | 273 |
| 5 | 93 | −2 | 28.8 | 282 |
| 6 | 94 | −4 | 23.2 | 259 |
| 7 | 87 | −3 | 19.1 | 271 |
| 8 | 96 | 2-3 | 24.6 | 278 |
| 9 | 96 | −3 | 25.1 | 272 |

The table shows that best brilliance results are obtained using Example 2.

The invention claimed is:

1. 6-azo-5,5'-dihydroxy-7,7'-disulfo-2,2'-dinaphthylamine derivatives of formula

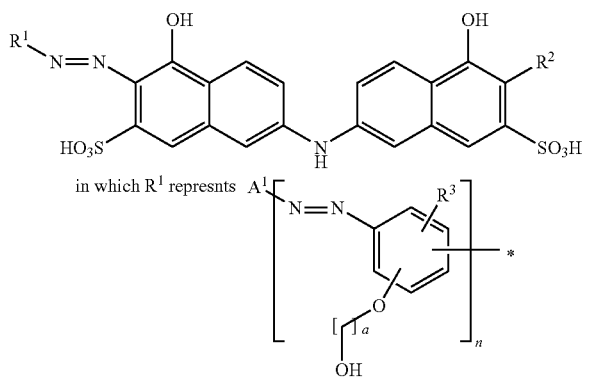

in which $R^1$ represnts $A^1 \left[ \begin{array}{c} \\ N=N \end{array} \right.$ in which a is 1-4 n is 0 or 1, $R^3$ represents hydrogen, $C_{1-4}$-alkyl, $C_{3-4}$-cycloalkyl, aralkyl, phenyl, $C_{1-4}$-alkoxy, sulfo, hydroxy, nitro, halogen, $C_{1-4}$-alkylcarbonyl, carboxy, carbamoyl, $C_{1-4}$-alkoxy-carbonyl, $C_{1-4}$-alkylaminocarbonyl, cyano, amino, ureido or $NHCOC_{1-4}$-alkyl, whereby $C_{1-4}$-alkyl and $C_{1-4}$-alkoxy may be substituted with hydroxy or $C_{1-4}$-alkoxy, and phenyl may be substituted with $C_{1-4}$-alkyl, $C_{1-4}$-alkoxy, sulfo, hydroxy, nitro, halogen or carboxy, and $A^1$ if n is 1 is selected from the group consisting of

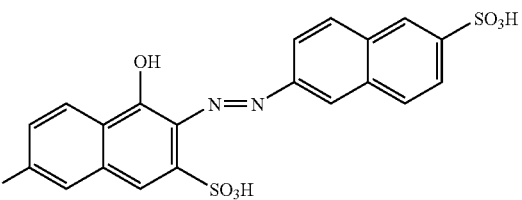

in which m, p and q are identical or different, and are 0, 1 or 2, $R^5$ and $R^6$ are identical or different and represent hydrogen, $C_{1-4}$-alkyl, $C_{3-6}$-cycloalkyl, aralkyl, phenyl, $C_{1-4}$-alkoxy, sulfo, hydroxy, nitro, halogen, $C_{1-4}$-alkylcarbonyl, carboxy, carbamoyl, $C_{1-4}$-alkoxycarbonyl, $C_{1-4}$-alkylaminocarbonyl, cyano, amino, ureido or NHCOC$_{1-4}$- alkyl, whereby $C_{1-4}$-alkyl and $C_{1-4}$-alkoxy may be substituted with hydroxy or $C_{1-4}$-alkoxy, and phenyl may be substituted with $C_{1-4}$-alkyl, $C_{1-4}$-alkoxy, sulfo, hydroxy, nitro, halogen or carboxy, and $A^1$ if n is 0 is

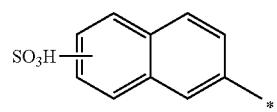

$R^2$ represents H or

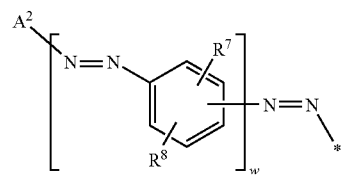

in which
w is 0 or 1,
R⁷ and R⁸ are identical or different and represent hydrogen, $C_{1-4}$-alkyl, $C_{3-6}$-cycloalkyl, aralkyl, phenyl, $C_{1-4}$-alkoxy, sulfo, hydroxy, nitro, halogen, $C_{1-4}$-alkylcarbonyl, carboxy, carbamoyl, $C_{1-4}$-alkoxycarbonyl, $C_{1-4}$-alkylaminocarbonyl, cyano, amino, ureido or NHCOC$_{1-4}$-alkyl, whereby $C_{1-4}$-alkyl and $C_{1-4}$-alkoxy may be substituted with hydroxy or $C_{1-4}$-alkoxy, and phenyl may be substituted with $C_{1-4}$-alkyl, $C_{1-4}$-alkoxy, sulfo, hydroxy, nitro, halogen or carboxy, and
$A^2$ represents either $A^1$, whereby $A^1$ has the meaning as indicated for the 6-azo-5,5'-di-hydroxy-7,7'-disulfo-2,2'-dinaphthylamine derivatives of the claimed formula (1), or $A^2$ represents

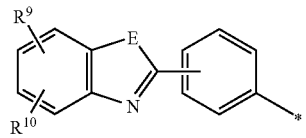

in which
$R^9$ and $R^{10}$ are identical or different and represent hydrogen, $C_{1-4}$-alkyl, $C_{1-4}$-alkoxy, sulfo, hydroxy, nitro or carboxy,
E represents sulfur or NH.

2. 6-azo-5,5'-dihydroxy-7,7'-disulfo-2,2'-dinaphthylamine derivatives formula 1 according to claim 1 wherein $R^1$ represents

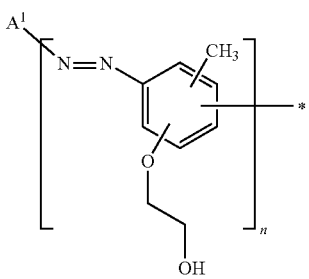

in which
n is 0 or 1,
$A^1$ if n is 1 is selected from the group consisting of

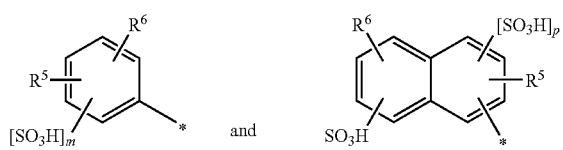

in which
m is 1 or 2,
p is 0 or 1,
$R^5$ is hydrogen, methyl or nitro,
$R^6$ is hydrogen or hydroxy, and
$R^2$ represents H or

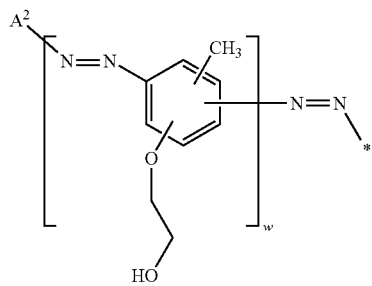

in which
w is 0 or 1,
$A^2$ represents either $A^1$, whereby $A^1$ is as defined above in claim 2, or is selected from the group consisting of

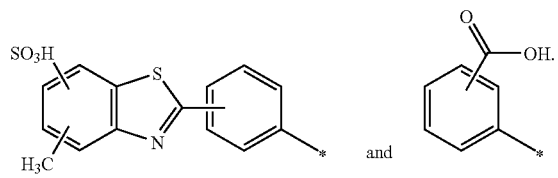

3. 6-azo-5,5'-dihydroxy-7,7'-disulfo-2,2'-dinaphthylamine derivatives of formula 1 according to claim 1 wherein n is 0 and $R^1$ and $R^2$ are both

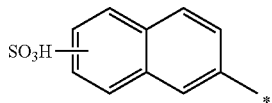

4. A method of dyeing natural or synthetic materials by applying the 6-azo-5,5'-dihydroxy-7,7'-disulfo-2,2'-dinaphthylamine derivatives according to claim 1 to said materials.

5. A method for dyeing paper by applying the 6-azo-5,5'-dihydroxy-7,7'-disulfo-2,2'-dinaphthylamine derivatives according to claim 1 to the paper or paper pulp.

6. Paper dyed with a 6-azo-5,5'-dihydroxy-7,7'-disulfo-2,2'-dinaphthylamine derivatives according to claim 1.

7. An aqueous formulation comprising a 6-azo-5,5'-dihydroxy-7,7'-disulfo-2,2'-di-naphthylamine derivative according to claim 1.

8. A solid formulation comprising a 6-azo-5,5'-dihydroxy-7,7'-disulfo-2,2'-dinaphthylamine derivative according to claim 1.

* * * * *